US011604087B2

(12) United States Patent
Youn et al.

(10) Patent No.: US 11,604,087 B2
(45) Date of Patent: Mar. 14, 2023

(54) METHOD AND APPARATUS FOR CALCULATING VOLUME OF COMPRESSED GAS STORAGE VESSEL, COMPUTER, AND MEDIUM

(71) Applicants: China Energy Investment Corporation Limited, Beijing (CN); National Institute of Clean-and-Low-Carbon Energy, Beijing (CN)

(72) Inventors: Edward Youn, Pacific Grove, CA (US); Xianming Li, Orefield, PA (US); Pingjiao Hao, Fremont, CA (US); Anthony Ku, Fremont, CA (US); Jerad Allen Stager, Richmond, CA (US)

(73) Assignees: China Energy Investment Corporation Limited, Beijing (CN); National Institute of Clean-and-Low-Carbon Energy, Beijing (CN)

(*) Notice: Subject to any disclaimer, the term of this patent is extended or adjusted under 35 U.S.C. 154(b) by 311 days.

(21) Appl. No.: 17/027,697

(22) Filed: Sep. 21, 2020

(65) Prior Publication Data
US 2022/0090952 A1 Mar. 24, 2022

(51) Int. Cl.
*G01F 17/00* (2006.01)
*F17C 9/02* (2006.01)

(52) U.S. Cl.
CPC .......... *G01F 17/00* (2013.01); *F17C 9/02* (2013.01); *F17C 2205/0323* (2013.01);
(Continued)

(58) Field of Classification Search
CPC .... G01F 17/00; F17C 9/02; F17C 2205/0323; F17C 2221/012; F17C 2223/0123;
(Continued)

(56) References Cited

U.S. PATENT DOCUMENTS

| 5,479,966 | A  | * | 1/1996  | Tison   | F17C 5/06   |
|           |    |   |         |         | 141/83      |
| 5,570,729 | A  | * | 11/1996 | Mutter  | F17C 13/02  |
|           |    |   |         |         | 141/2       |
| 5,628,349 | A  | * | 5/1997  | Diggins | F17C 5/06   |
|           |    |   |         |         | 141/3       |
| 6,708,573 | B1 | * | 3/2004  | Cohen   | G01F 1/125  |
|           |    |   |         |         | 73/865      |

(Continued)

*Primary Examiner* — Timothy P. Kelly
*Assistant Examiner* — Stephanie A Shrieves
(74) *Attorney, Agent, or Firm* — Calfee Halter & Griswold LLP (57) ABSTRACT

Provided are a method and apparatus for calculating a volume of a compressed gas storage vessel, a computer, and a medium. According to the method, three test vessels with known volume and initial pressure are used to establish a pressure equilibrium with a compressed gas storage system, and pressure values in three equilibrium states are respectively detected. In this way, according to the three pressure values and the known volumes and initial pressures, a volume of the compressed gas storage system, a volume of a hose, and a pressure value of the compressed gas storage system in an initial state can be quickly and accurately calculated. By accurately obtaining the volume of the compressed gas storage system, the volume of the hose, and the pressure value of the compressed gas storage system in the initial state, a refueling rate can be increased as much as possible while ensuring safe refueling.

9 Claims, 4 Drawing Sheets

(52) U.S. Cl.
CPC .............. *F17C 2221/012* (2013.01); *F17C 2223/0123* (2013.01); *F17C 2250/032* (2013.01); *F17C 2250/043* (2013.01); *F17C 2250/0426* (2013.01); *F17C 2260/026* (2013.01); *F17C 2265/065* (2013.01); *F17C 2270/0168* (2013.01)

(58) Field of Classification Search
CPC ........ F17C 2250/032; F17C 2250/0426; F17C 2250/043; F17C 2260/026; F17C 2265/065; F17C 2270/0168; Y20E 60/32
USPC .......................................................... 33/1 V
See application file for complete search history.

(56) References Cited

U.S. PATENT DOCUMENTS

| | | | |
|---|---|---|---|
| 7,059,364 B2 | 6/2006 | Kountz et al. | |
| 9,982,842 B2 | 5/2018 | Adler et al. | |
| 10,082,247 B1 | 9/2018 | Sinding | |
| 2004/0123898 A1* | 7/2004 | Yamashita | F16K 31/1635 137/7 |
| 2005/0178463 A1* | 8/2005 | Kountz | F17C 9/02 141/4 |
| 2011/0022337 A1* | 1/2011 | Macron | F17C 13/025 702/55 |
| 2012/0318403 A1* | 12/2012 | Cohen | F17C 5/06 141/3 |
| 2014/0174152 A1* | 6/2014 | Gil | G01N 33/225 73/25.01 |
| 2018/0259127 A1* | 9/2018 | Manousiouthakis | F17C 5/02 |
| 2018/0356270 A1 | 12/2018 | Mathison | |
| 2019/0301678 A1* | 10/2019 | Yamaguchi | F17C 13/025 |

* cited by examiner

```
┌─────────────────────────────────────────────────────┐
│ a connection is established between the compressed │
│ gas storage system and a gas dispenser. The gas     │
│ dispenser includes a hose and at least three test   │──── 110
│ vessels with known volume and initial pressure. The │
│ three test vessels are in communication with the    │
│ compressed gas storage system via the hose. The     │
│ three test vessels include a first vessel, a second │
│ vessel, and a third vessel. The first vessel is in  │
│ communication with the hose via a first valve, the  │
│ second vessel is in communication with the hose via │
│ a second valve, and the third vessel is in          │
│ communication with the hose via a third valve. In   │
│ an initial state, the first valve, the second valve,│
│ and the third are in a closed state                 │
└─────────────────────────────────────────────────────┘
                          │
                          ▼
┌─────────────────────────────────────────────────────┐
│ the first valve is opened so that the first vessel  │
│ is in communication with the compressed gas storage │──── 120
│ system; a first pressure value of the first vessel, │
│ the hose, and the compressed gas storage system is  │
│ detected when a pressure equilibrium state is       │
│ reached between the first vessel, the hose, and the │
│ compressed gas storage system; and then the first   │
│ valve is closed.                                    │
└─────────────────────────────────────────────────────┘
                          │
                          ▼
┌─────────────────────────────────────────────────────┐
│ the second valve is opened so that the second       │──── 130
│ vessel is in communication with the compressed gas  │
│ storage system; a second pressure value of the      │
│ second vessel, the hose, and the compressed gas     │
│ storage system is detected when a pressure          │
│ equilibrium state is reached between the second     │
│ vessel, the hose, and the compressed gas storage    │
│ system; and then the second valve is closed.        │
└─────────────────────────────────────────────────────┘
                          │
                          ▼
┌─────────────────────────────────────────────────────┐
│ the third valve is opened so that the third vessel  │──── 140
│ is in communication with the compressed gas storage │
│ system; and a third pressure value of the third     │
│ vessel, the hose, and the compressed gas storage    │
│ system is detected when a pressure equilibrium      │
│ state is reached between the third vessel, the      │
│ hose, and the compressed gas storage system.        │
└─────────────────────────────────────────────────────┘
                          │
                          ▼
┌─────────────────────────────────────────────────────┐
│ the volume of the compressed gas storage system, a  │──── 150
│ volume of the hose, and a pressure value of the     │
│ compressed gas storage system in the initial state  │
│ are calculated based on equations of relation       │
│ between pressure and volume of gas and              │
│ compressibility factor as well as the mass          │
│ conservation principle and according to the volumes │
│ and initial pressures of the first, second and      │
│ third vessels, the first pressure value, the second │
│ pressure value, and the third pressure value.       │
└─────────────────────────────────────────────────────┘
```

METHOD AND APPARATUS FOR CALCULATING VOLUME OF COMPRESSED GAS STORAGE VESSEL, COMPUTER, AND MEDIUM

FIELD OF THE INVENTION

The present disclosure relates to the technical field of gaseous fueled vehicles, and in particular, to a method and apparatus for calculating a volume of a compressed gas storage vessel, a computer, and a medium.

BACKGROUND OF THE INVENTION

For hydrogen refueling in the absence of electronic communication means, commonly known as non-communication fill, a method to determine the volume of the unknown vehicle onboard storage system (also known as the compressed hydrogen storage system or CHSS) and the initial state of charge, namely, of the onboard storage vessel pressure is needed. In particular, accurate estimation of the CHSS volume enables the determination of safe pressure ramping rate to keep the CHSS temperature within allowed limits. Furthermore, while addressing the integrity of data from a vehicle communication system in a communications fill (also known as communication fill), U.S. Patent No. 20180356270A1 cautions that vehicle sensors might fail, a multi-tank system might have a valve closed incorrectly for a subsection, and so on. The result is that the data reported from the communications link might be unreliable. Thus, it is not advisable to measure the volume and initial pressure of the storage vessel of the vehicle onboard storage system by obtaining data from the communications link alone.

According to the prior art, independent checks from the filling station side via measurements are important. One such measurement is to use flow meters to estimate the volume of the CHSS, and compare this calculated volume with the reported value. An evaluation time period is selected. The density of the gas inside the CHSS is noted at the beginning and the end of the evaluation period. The mass of hydrogen added during this evaluation period is computed by integrating the flow rate over the evaluation time period. Then the volume of CHSS is the added mass divided by the density difference between the end and the beginning of the evaluation period. It is important to note that the accuracy of the CHSS volume computed by this method depends on the flow meter accuracy, the control valve properties, and the piping configuration, thus custom tuning at each system is required.

U.S. Pat. No. 9,982,842 raises a concern with the impact of a large pressure pulse (the peak pressure up to 130% of the CHSS nominal working pressure of 35 MPa or 70 MPa) on the components in a system such as flow meter, valves, and hose. The large pressure pulse referred to in this case is the initial connection pulse as described in the Society of Automotive Engineers standard SAE J2601. To lessen the impact, a bypass is added which has an automated control valve and an orifice. The orifice limits the maximum flow, and the control valve sets the duration of the pulse. It is clear that the flow duration and the orifice size must be adjusted for each filling station to achieve acceptable accuracy, thus it is custom tuned in each system. It is also noted that this patent does not teach how to measure the CHSS volume or state of charge independently.

U.S. patent Ser. No. 10/082,247B1 discloses a method to measure the CHSS volume and the state of charge with a control valve to generate a pulse of "typically 1 second . . . from historical refueling data." Subsequently volume and state of charge are determined by the measured pressure and temperature of the vehicle storage tank. The control valve properties, pulse duration, the piping network, and flow meter accuracy are unique in each system, thus custom tuning is required for each system.

U.S. Pat. No. 7,059,364 discloses a detailed implementation of a control method based on generating pulses with a control valve. Again, the control valve properties, pulse duration, the piping network, and flow meter accuracy are unique in each system, thus custom tuning is required.

There are numerous pieces of prior art on using pulses to estimate the CHSS volume and state of charge, but none is able to be station independent due to variables such as the accuracy of flow measurement devices, the response time of control valves, and piping network. Thus, customized adjustment or tuning is required for each system. The three pieces of prior art cited here are only representative examples.

It is the object of the present disclosure to devise a method for calculating a volume of a compressed hydrogen storage system and state of charge without the influence of variables such as flow meter accuracy, control system response, control valve properties, and hose volume.

SUMMARY OF THE INVENTION

In view of the above, it is necessary to provide a method and apparatus for calculating a volume of a compressed gas storage vessel, a computer, and a medium to solve the above technical problems.

A method for calculating a volume of a compressed gas storage vessel includes:

establishing a connection between the compressed gas storage system and a gas dispenser, the gas dispenser including a hose and at least three test vessels with known volume and initial pressure, the three test vessels being in communication with the compressed gas storage system via the hose, wherein the three test vessels include a first vessel, a second vessel, and a third vessel, wherein the first vessel is in communication with the hose via a first valve, the second vessel is in communication with the hose via a second valve, the third vessel is in communication with the hose via a third valve, and in an initial state, the first valve, the second valve, and the third valve are in a closed state;

opening the first valve so that the first vessel is in communication with the compressed gas storage system, detecting a first pressure value of the first vessel, the hose and the compressed gas storage system when a pressure equilibrium state is reached between the first vessel, the hose, and the compressed gas storage system, and then closing the first valve;

opening the second valve so that the second vessel is in communication with the compressed gas storage system, detecting a second pressure value of the second vessel, the hose and the compressed gas storage system when a pressure equilibrium state is reached between the second vessel, the hose, and the compressed gas storage system, and then closing the second valve;

opening the third valve so that the third vessel is in communication with the compressed gas storage system, and detecting a third pressure value of the third vessel, the hose and the compressed gas storage system when a pressure equilibrium state is reached between the third vessel, the hose, and the compressed gas storage system; and calculating the volume of the compressed gas storage system, a volume of the hose, and a pressure value of the compressed gas storage system in the initial state based on equations of relation between pressure and volume of gas and compressibility factor as well as the mass conservation principle and according to the volumes and initial pressures of the first, second and third vessels, the first pressure value, the second pressure value, and the third pressure value.

In one embodiment, the compressed gas includes one of gaseous hydrogen, vaporized liquid hydrogen, natural gas, vaporized liquefied natural gas, and gaseous propane.

In one embodiment, the gas dispenser further includes a nozzle and a control valve. The hose is in communication with the compressed gas storage system via the nozzle, and the control valve is provided on the hose.

In one embodiment, the initial pressure of the first vessel, the initial pressure of the second vessel, and the initial pressure of the third vessel are configured such that the initial pressure of the first vessel, the initial pressure of the second vessel, and the initial pressure of the third vessel are equal; alternatively, the initial pressure of the first vessel, the initial pressure of the second vessel, and the initial pressure of the third vessel are not equal. The volume of the first vessel, the volume of the second vessel, and the volume of the third vessel are configured such that the volume of the first vessel, the volume of the second vessel, and the volume of the third vessel are equal; alternatively, the volume of the first vessel, the volume of the second vessel, and the volume of the third vessel are not equal.

In one embodiment, a total mass of fuel contained in the three test vessels is less than or equal to a mass of fuel specified by an industry standard.

In one embodiment, the initial pressure of the first vessel, the initial pressure of the second vessel, and the initial pressure of the third vessel are respectively 30% to 130% of a normal working pressure of the compressed gas storage system.

In one embodiment, the initial pressure of the first vessel, the initial pressure of the second vessel, and the initial pressure of the third vessel are respectively 80% to 125% of a normal working pressure of the compressed gas storage system.

An apparatus for calculating a volume of a compressed gas storage vessel includes a connecting module, a first pressure value obtaining module, a second pressure value obtaining module, a third pressure value obtaining module, and a volume and pressure calculating module.

The connecting module is configured to establish a connection between the compressed gas storage system and a gas dispenser, the gas dispenser including a hose and at least three test vessels with known volume and initial pressure, the three test vessels being in communication with the compressed gas storage system via the hose. The three test vessels include a first vessel, a second vessel, and a third vessel. The first vessel is in communication with the hose via a first valve, the second vessel is in communication with the hose via a second valve, and the third vessel is in communication with the hose via a third valve. In an initial state, the first valve, the second valve, and the third valve are in a closed state.

The first pressure value obtaining module is configured to open the first valve so that the first vessel is in communication with the compressed gas storage system, to detect a first pressure value of the first vessel, the hose and the compressed gas storage system when a pressure equilibrium state is reached between the first vessel, the hose, and the compressed gas storage system, and then to close the first valve.

The second pressure value obtaining module is configured to open the second valve so that the second vessel is in communication with the compressed gas storage system, to detect a second pressure value of the second vessel, the hose and the compressed gas storage system when a pressure equilibrium state is reached between the second vessel, the hose, and the compressed gas storage system, and then to close the second valve.

The third pressure value obtaining module is configured to open the third valve so that the third vessel is in communication with the compressed gas storage system, and to detect a third pressure value of the third vessel, the hose and the compressed gas storage system when a pressure equilibrium state is reached between the third vessel, the hose, and the compressed gas storage system.

The volume and pressure calculating module is configured to calculate the volume of the compressed gas storage system, a volume of the hose, and a pressure value of the compressed gas storage system in the initial state based on equations of relation between pressure and volume of gas and compressibility factor as well as the mass conservation principle and according to the volumes and initial pressures of the first, second and third vessels, the first pressure value, the second pressure value, and the third pressure value.

A computer device includes a memory and a processor, the memory having a computer program stored therein. The computer program, when executed by the processor, implements steps of the method described in any one of the above embodiments.

A computer-readable storage medium has a computer program stored thereon. The computer program, when executed by a processor, implements steps of the method described in any one of the above embodiments.

According to the above method and apparatus for calculating a volume of a compressed gas storage vessel, the computer, and the medium, the three test vessels with known volume and initial pressure are used to establish a pressure equilibrium with the compressed gas storage system in sequence, and pressure values in three equilibrium states are respectively detected. In this way, according to the three pressure values and the known volumes and initial pressures, the volume of the compressed gas storage system, the volume of the hose, and the pressure value of the compressed gas storage system in the initial state can be quickly and accurately calculated without the influence of flow meter accuracy, control system response speed, and hose volume. By accurately obtaining the volume of the compressed gas storage system, the volume of the hose, and the pressure value of the compressed gas storage system in the initial state, a refueling rate can be increased as much as possible while ensuring safe refueling.

BRIEF DESCRIPTION OF THE DRAWINGS

FIG. 1 is a schematic flowchart of a method for calculating a volume of a compressed gas storage vessel, in one embodiment;

DETAILED DESCRIPTION OF THE EMBODIMENTS

In order to make the objectives, technical solutions and advantages of the present application clearer, the present application will be further illustrated in detail below in conjunction with the accompanying drawings and embodiments. It should be understood that the embodiments described herein are only used for explaining the present application, rather than limiting the present application.

It should be understood that although hydrogen refueling is described as an example in the embodiments below, the method and system disclosed in this application apply to any gaseous fueled vehicle and are not limited to hydrogen fueled vehicles.

In one embodiment, as shown in FIG. 1, provided is a method for calculating a volume of a compressed gas storage vessel, the method including following steps 110-150.

In step 110, a connection is established between the compressed gas storage system and a gas dispenser. The gas dispenser includes a hose and at least three test vessels with known volume and initial pressure. The three test vessels are in communication with the compressed gas storage system via the hose. The three test vessels include a first vessel, a second vessel, and a third vessel. The first vessel is in communication with the hose via a first valve, the second vessel is in communication with the hose via a second valve, and the third vessel is in communication with the hose via a third valve. In an initial state, the first valve, the second valve, and the third are in a closed state.

Specifically, the first valve, the second valve, and the third valve are respectively configured to control connection/disconnection between the first, second and third vessels and the compressed gas storage system. The hose is a flexible tube or a hard tube. The first vessel, the second vessel, and the third vessel are in communication with a storage vessel of the compressed gas storage system via the hose. In an initial state, the first valve, the second valve, and the third valve are in a closed state, so that the first vessel, the second vessel, and the third vessel are respectively disconnected from the hose and the storage vessel of the compressed gas storage system. It should be understood that in this embodiment, the compressed gas storage system is a compressed hydrogen storage system (CHSS). In the initial state, the volumes of the three test vessels and the pressures within the three test vessels are known. The pressures of the test vessels in the initial state are initial pressures. In this embodiment, the volumes of the first, second and third vessels are denoted as Va, Vb, and Vc, respectively, and the initial pressures of the first, second and third vessels are denoted as Pa, Pb, and Pc, respectively.

In step 120, the first valve is opened so that the first vessel is in communication with the compressed gas storage system; a first pressure value of the first vessel, the hose, and the compressed gas storage system is detected when a pressure equilibrium state is reached between the first vessel, the hose, and the compressed gas storage system; and then the first valve is closed.

In this step, the first valve is opened to allow the first vessel to be in communication with the storage vessel of the compressed gas storage system, so that the first vessel, the hose, and the storage vessel of the compressed gas storage system are in communication with one another. In this way, a pressure equilibrium can be reached between the first vessel, the hose, and the storage vessel of the compressed gas storage system, so that the pressures within the first vessel, the hose, and the storage vessel of the compressed gas storage system are equal. In this case, the pressures of the first vessel, the hose, and the storage vessel of the compressed gas storage system are detected to obtain a first pressure value, the first pressure value being $P_1$. Then, the first valve is closed to disconnect the first vessel from the hose and the storage vessel of the compressed gas storage system.

In step 130, the second valve is opened so that the second vessel is in communication with the compressed gas storage system; a second pressure value of the second vessel, the hose, and the compressed gas storage system is detected when a pressure equilibrium state is reached between the second vessel, the hose, and the compressed gas storage system; and then the second valve is closed.

In this step, the second valve is opened to allow the second vessel to be in communication with the storage vessel of the compressed gas storage system, so that the second vessel, the hose, and the storage vessel of the compressed gas storage system are in communication with one another. In this way, a pressure equilibrium again can be reached between the second vessel, the hose, and the storage vessel of the compressed gas storage system, so that the pressures within the second vessel, the hose, and the storage vessel of the compressed gas storage system are equal. In this case, the pressures of the second vessel, the hose, and the storage vessel of the compressed gas storage system are detected to obtain a second pressure value, the second pressure value being $P_2$. Then, the second valve is closed to disconnect the second vessel from the hose and the storage vessel of the compressed gas storage system.

In step 140, the third valve is opened so that the third vessel is in communication with the compressed gas storage system; and a third pressure value of the third vessel, the hose, and the compressed gas storage system is detected when a pressure equilibrium state is reached between the third vessel, the hose, and the compressed gas storage system.

In this step, the third valve is opened to allow the third vessel to be in communication with the storage vessel of the compressed gas storage system, so that the third vessel, the hose, and the storage vessel of the compressed gas storage system are in communication with one another. In this way, a pressure equilibrium again can be reached between the third vessel, the hose, and the storage vessel of the compressed gas storage system, so that the pressures within the third vessel, the hose, and the storage vessel of the compressed gas storage system are equal. In this case, the pressures of the third vessel, the hose, and the storage vessel of the compressed gas storage system are detected to obtain a third pressure value, the third pressure value being $P_3$. Then, the third valve is closed to disconnect the third vessel from the hose and the storage vessel of the compressed gas storage system.

In step 150, the volume of the compressed gas storage system, a volume of the hose, and a pressure value of the compressed gas storage system in the initial state are calculated based on equations of relation between pressure and volume of gas and compressibility factor as well as the mass conservation principle and according to the volumes and initial pressures of the first, second and third vessels, the first pressure value, the second pressure value, and the third pressure value.

Specifically, the equations of relation between pressure and volume of gas and compressibility factor are used to reflect relations between pressure and volume of gas and compressibility factor. The compressibility factors can be evaluated with a property database or a curve fit equation such as that disclosed in U.S. Pat. No. 7,059,364.

It should be understood that the mass conservation principle is satisfied before and after each test vessel communicates with the compressed gas storage system, that is, the sum of the mass of gas in a test vessel and the mass of gas in the compressed gas storage system before the test vessel communicates with the compressed gas storage system is equal to the sum of the mass of gas in the test vessel and the mass of gas in the compressed gas storage system after the test vessel communicates with the compressed gas storage system. In this embodiment, the volume of the storage vessel of the compressed gas storage system, the volume of the hose, and the pressure value of the compressed gas storage system in the initial state are calculated based on equations of relation between pressure and volume of gas and compressibility factor and according to the volumes and initial pressures of the first, second and third vessels, the first pressure value, the second pressure value, and the third pressure value.

In the above embodiment, three test vessels with known volume and initial pressure are used to establish a pressure equilibrium with the compressed gas storage system in sequence, and the pressure values in three equilibrium states are respectively detected. In this way, according to the three pressure values as well as the known volumes and initial pressures of the three test vessels, the volume of the compressed gas storage system, the volume of the hose, and the pressure value of the compressed gas storage system in the initial state can be quickly and accurately calculated without the influence of flowmeter accuracy, control system response speed, and hose volume. By accurately obtaining the volume of the compressed gas storage system, the volume of the hose, and the pressure value of the compressed gas storage system in the initial state, a refueling rate can be increased as much as possible while ensuring safe refueling.

It should be understood that, in the above embodiment, each test vessel maintains a communication state with the compressed hydrogen storage system after reaching a pressure equilibrium, so that the pressure equilibrium state is maintained to increase the measurement accuracy of the first pressure value, the second pressure value, and the third pressure value.

In one embodiment, the compressed gas includes one of gaseous hydrogen, vaporized liquid hydrogen, natural gas, vaporized liquefied natural gas, and gaseous propane. In this embodiment, the compressed gas is a gaseous fuel, the gaseous fuel including one of gaseous hydrogen, vaporized liquid hydrogen, natural gas, vaporized liquefied natural gas, and gaseous propane. It should be understood that the method described in this application is suitable for pressure detection and state of charge detection for various gaseous fuels. These other fuels include but are not limited to gaseous hydrogen, vaporized liquid hydrogen, natural gas, vaporized liquefied natural gas, and gaseous propane.

In one embodiment, the gas dispenser further includes a nozzle and a control valve. The hose is in communication with the compressed gas storage system via the nozzle, and the control valve is provided on the hose. Specifically, the control valve includes a check valve and a shutoff valve. Both the check valve and the shutoff valve are provided on the hose, and are configured to control connection/disconnection of the hose. In this way, in the initial state, the hose is disconnected by controlling the check valve and the shutoff valve, so that the three test vessels can be disconnected from the compressed gas storage system. As such, in the initial state, when one of the first valve, the second valve, and the third valve is opened, the hose can communicate with one of the test vessels, so that the pressure of the hose is equal to the pressure of one of the test vessels.

In one embodiment, the volume of the first vessel, the volume of the second vessel, and the volume of the third vessel are equal.

In one embodiment, the volume of the first vessel, the volume of the second vessel, and the volume of the third vessel are not equal.

In one embodiment, the initial pressure of the first vessel, the initial pressure of the second vessel, and the initial pressure of the third vessel are equal.

In one embodiment, the initial pressure of the first vessel, the initial pressure of the second vessel, and the initial pressure of the third vessel are not equal.

In one embodiment, a total mass of fuel that can be contained in the three test vessels is less than or equal to a mass of fuel specified by an industry standard. This industry standard is the industry standard SAE J2601, and a total mass of fuel that can be contained in the three test vessels is less than or equal to a total mass of fuel specified by the industry standard SAE J2601. In this way, the measurement accuracy and safety can be effectively improved.

In one embodiment, the initial pressure of the first vessel, the initial pressure of the second vessel, and the initial pressure of the third vessel are respectively 30% to 130% of a normal working pressure of the compressed gas storage system. By configuring the initial pressure of the first vessel, the initial pressure of the second vessel, and the initial pressure of the third vessel to be respectively 30% to 130% of the normal working pressure of the compressed gas storage system, the measurement and calculation accuracy can be effectively improved.

In one embodiment, the initial pressure of the first vessel, the initial pressure of the second vessel, and the initial pressure of the third vessel are respectively 80% to 125% of the normal working pressure of the compressed gas storage system. By configuring the initial pressure of the first vessel, the initial pressure of the second vessel, and the initial pressure of the third vessel to be respectively 80% to 125% of the normal working pressure of the compressed gas storage system, the measurement and calculation accuracy can be effectively improved.

In one embodiment, the initial pressure of the first vessel, the initial pressure of the second vessel, and the initial pressure of the third vessel are respectively 90% to 125% of the normal working pressure of the compressed gas storage system. By configuring the initial pressure of the first vessel, the initial pressure of the second vessel, and the initial pressure of the third vessel to be respectively 90% to 125% of the normal working pressure of the compressed gas storage system, the measurement and calculation accuracy can be effectively improved.

The following is a specific embodiment.

In the present disclosure, at least three test vessels with known volume, pressure and temperature are used to determine a volume and pressure of a storage vessel of an onboard compressed gas storage system. These vessels are limited in size so that the total amount of hydrogen stored in them is less than 200 g, as prescribed by the industry standard SAE J2601. For example, 200 g of hydrogen has a volume of 7.1 liters at 45 MPa and 300 K, and thus it requires test vessels of a total volume of 7.1 liters, where the compressibility factor is 1.28. The method disclosed herein relies on releasing the known volumes of the test vessels one at a time and measuring the resulting equilibrium pressure when an equilibrium state is reached between each test vessel and the storage vessel of the compressed gas storage system. Conservation of mass supplemented by a proper equation of state provides the relation between the known volumes and pressures and the unknown volume and pressure of the compressed gas storage system. With three test vessels, three balance equations are available to determine the pressure and volume of the compressed gas storage system of the vehicle and the hose volume. The benefit is that the calculated pressure and volume of the compressed gas storage system of the vehicle and hose volume are not influenced by station dependent variables such as hose volume, valve response rate, flow meter accuracy, and the method can be used without custom tuning.

In this embodiment, the compressed gas storage system of the vehicle is a compressed hydrogen storage system, hereinafter referred to as CHSS.

Figure 4:
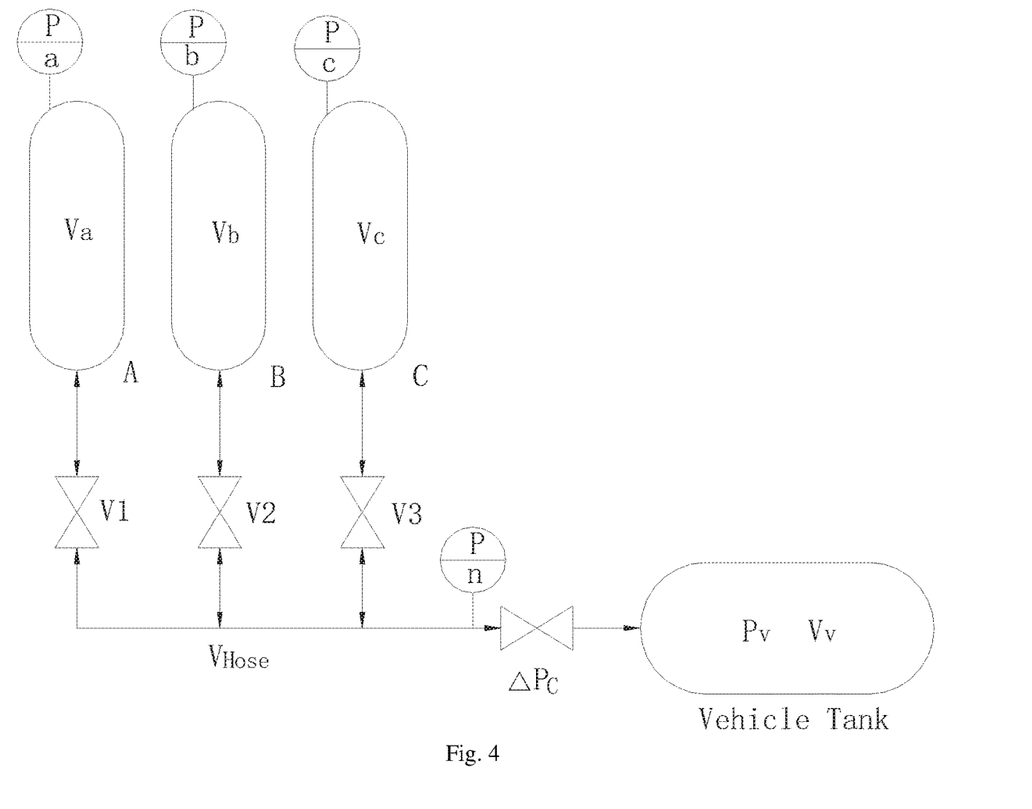
FIG. 4 is a schematic diagram showing a structure of connection between a filling station and a compressed gas storage system, in one embodiment.

Referring to FIG. 4, in this embodiment, a first vessel A, a second vessel B, and a third vessel C are connected to a storage vessel Vehicle Tank of the CHSS via a hose. An initial pressure of the storage vessel Vehicle Tank is Pv, a volume of the storage vessel Vehicle Tank is $V_v$, and a volume of the hose is $V_{hose}$.

First, the volumes and initial pressures of the three test vessels are detected. The volumes of the first, second, and third vessels are $V_a$, $V_b$, and $V_c$, respectively. In an initial state, the initial pressures of the first, second and third vessels are $P_a$, $P_b$, and $P_c$, respectively. In the initial state, a first valve $V_1$, a second valve $V_2$, and a third valve $V_3$ are in a closed state, and the first vessel, the second vessel, and the third vessel are disconnected from the CHSS.

First, the first valve is opened so that the first vessel A is in fluid communication with the CHSS. In this case, the volume $V_a$ of the first vessel is a known quantity, and the initial pressure and volume of the CHSS are unknown quantities. After the fluid communication between the first vessel and the CHSS is established, a relation between the volume $V_a$ of the first vessel and the initial pressure Pv and volume $V_v$ of the CHSS is established. The volume of the hose is $V_{hose}$, and in the initial state, the pressure in the hose is equal to the pressure in the test vessel. The CHSS, the test vessel, and the hose are all at the ambient temperature $T_{amb}$. After the first vessel communicates with the CHSS, a first pressure value $P_1$ when the first vessel and the CHSS reach a pressure equilibrium state is detected and recorded at this time. This initial pulse is similar to the "connection pulse" as described in the industry standard J2601 if the mass added to the CHSS is assumed to be negligible. This assumption is used here only to approximate the CHSS initial pressure to determine if fueling of the vehicle should proceed further. Specifically, this measured initial pressure $P_1$ can be used to perform leak check and to start refueling if the measured initial pressure $P_1$ is within the range of the nominal working pressure of the vehicle, i.e. 35 MPa or 70 MPa.

According to the mass conservation principle, a total mass of gas in the first vessel and the CHSS before the fluid communication between the first vessel and the CHSS is established is equal to a total mass of gas in the first vessel and the CHSS after the fluid communication between the first vessel and the CHSS is established. After the fluid communication between the first vessel and the CHSS is established, the first vessel will release gas into the storage vessel of the CHSS. Therefore, the mass conservation principle can be used to relate the state before and after the fluid communication between the first vessel and the CHSS is established, i.e., the state before and after the release of gas from the first vessel. Before the release of gas from the first vessel, assuming that the gas is an ideal gas, the relation between pressure and volume of gas and compressibility factor is:

$$\frac{P_a V_a M}{Z_a R_u T_{amb}} + \frac{P_a V_{hose} M}{Z_a R_u T_{amb}} + \frac{P_v V_v M}{Z_v R_u T_{amb}} \qquad (1)$$

The relation between pressure and volume of gas and compressibility factor after the release of gas from the first vessel is:

$$\frac{P_1 V_a M}{Z_1 R_u T_{amb}} + \frac{P_1 V_{hose} M}{Z_1 R_u T_{amb}} + \frac{P_1 V_v M}{Z_1 R_u T_{amb}} \qquad (2)$$

In Formula (1) and Formula (2), M is a molecular weight of hydrogen, $R_u$ is a universal gas constant, $Z_a$ is a compressibility factor evaluated at Pa, $Z_v$ is a compressibility factor evaluated at $P_v$, $Z_1$ is a compressibility factor evaluated at $P_1$, and $T_{amb}$ is the ambient temperature. The above parameters are all measured or evaluated at the ambient temperature $T_{amb}$. The compressibility factors can be evaluated with a property database or a curve fit equation such as that disclosed in U.S. Pat. No. 7,059,364. According to the conservation of mass, Formula (1) and Formula (2) are equal. Therefore, Formula (1) and Formula (2) are related and simplified to obtain the following equation:

$$\frac{P_a V_a}{Z_a} + \frac{P_a V_{hose}}{Z_a} + \frac{P_v V_v}{Z_v} = \frac{P_1 V_a}{Z_1} + \frac{P_1 V_{hose}}{Z_1} + \frac{P_1 V_v}{Z_1} \qquad (3)$$

Next, the first valve is closed to disconnect the first vessel A, and the second valve is opened so that a fluid communication is established between the second vessel B and the hose and CHSS. After the second vessel communicates with the CHSS and a pressure equilibrium is reached, a second pressure value $P_2$ when the second vessel and the CHSS reach a pressure equilibrium state is detected and recorded at this time. Since the total mass of the gas added to the CHSS is limited in this case, it can be assumed that the temperature of the CHSS, the test vessel and the hose remains unchanged at the current ambient temperature. The conservation of mass before and after the release of gas from the second vessel B can be represented by the following equation:

$$\frac{P_b V_b}{Z_b} + \frac{P_1 V_{hose}}{Z_1} + \frac{P_1 V_v}{Z_1} = \frac{P_2 V_b}{Z_2} + \frac{P_2 V_{hose}}{Z_2} + \frac{P_2 V_v}{Z_2} \qquad (4)$$

Subsequently, the second valve is closed to disconnect the second vessel B, and the third valve is opened so that a fluid communication is established between the third vessel C and the hose and CHSS. After the third vessel communicates with the CHSS and a pressure equilibrium is reached, a third pressure value $P_3$ when the third vessel and the CHSS reach a pressure equilibrium state is detected and recorded at this time. Since the total mass of gas added to the CHSS is limited in this case, it can also be assumed that the temperature of the CHSS, the test vessel and the hose remains unchanged at the current ambient temperature. The conservation of mass before and after the release of gas from the third vessel C can be represented by the following equation:

$$\frac{P_c V_c}{Z_c} + \frac{P_2 V_{hose}}{Z_2} + \frac{P_2 V_v}{Z_2} = \frac{P_3 V_c}{Z_3} + \frac{P_3 V_{hose}}{Z_3} + \frac{P_3 V_v}{Z_3} \qquad (5)$$

The initial pressure $P_v$ and volume $V_v$ of the CHSS and the volume $V_{hose}$ of the hose can be accurately calculated based on Equations (3), (4) and (5) above and according to the known $V_a$, $V_b$, $V_c$, $P_a$, $P_b$ and $P_c$ as well as the measured $P_1$, $P_2$ and $P_3$. For data quality and redundancy, additional test vessels may be used to provide further measurements and the solution is obtained in the least squares sense. Additional test vessels may also be used to determine other variables and relax some assumptions such as CHSS initial temperature.

To better improve the measurement accuracy, each test vessel may release a unique amount of mass to improve the influence of nonlinearity. This influence is caused with different test vessel size and/or initial state such as pressure and temperature.

Embodiment One

Assume three test vessels having volumes 1 L, 2 L, and 3 L, initially at 450 barg. Ambient temperature is 300 K. The CHSS volume is 1200 L and initially at 50 barg. The hose volume is 0.5 L. For mathematical simplicity, the compressibility factor is assumed to be 1.0 for all conditions. From Equations 3-5, the calculated equilibrium pressures corresponding to releasing the test volumes in the order as stated above are, 50.50, 51.16, and 52.16 barg, respectively.

Embodiment Two

Assume three test vessels have volumes 2 L, 2 L, and 3 L, initially at 450 bar. Ambient temperature is 300 K. The measured equilibrium pressures corresponding to releasing the test volumes in the order as stated above are 63.0, 63.7, 64.5 barg, respectively. Again, for mathematical simplicity, the compressibility factor is assumed to be 1.0 for all conditions. The calculated CHSS volume is 1296.8 L, the calculated hose volume is 0.51 L, and the CHSS initial pressure is at 62.25 barg.

The main benefits of the present disclosure are summarized:

1. Permits repeatable, accurate estimation of the volume of the compressed gas storage vessel connected to the nozzle of the compressed gas dispenser.
2. Eliminates the reliance on control valve response time which may be unique to each dispensing system.
3. Eliminates the reliance on flow meter accuracy which may be unique to each dispensing system.
4. Eliminates an unknown variable identified as the total volume of the connection piping and the fueling hose which may be unique to each dispensing system.
5. Increases the confidence level of the recommended average dispensing pressure ramp rate via accurate estimation of the vessel volume.
6. Allows the increase of maximum fueling rate without jeopardizing safety of the compressed gas dispensing process.
7. Reduces the need for periodic recalibration due to aging equipment.
8. Allows flexible accommodation for varying volumes of the compressed gas storage vessels connected to the nozzle of the compressed gas dispenser.

Figure 2:
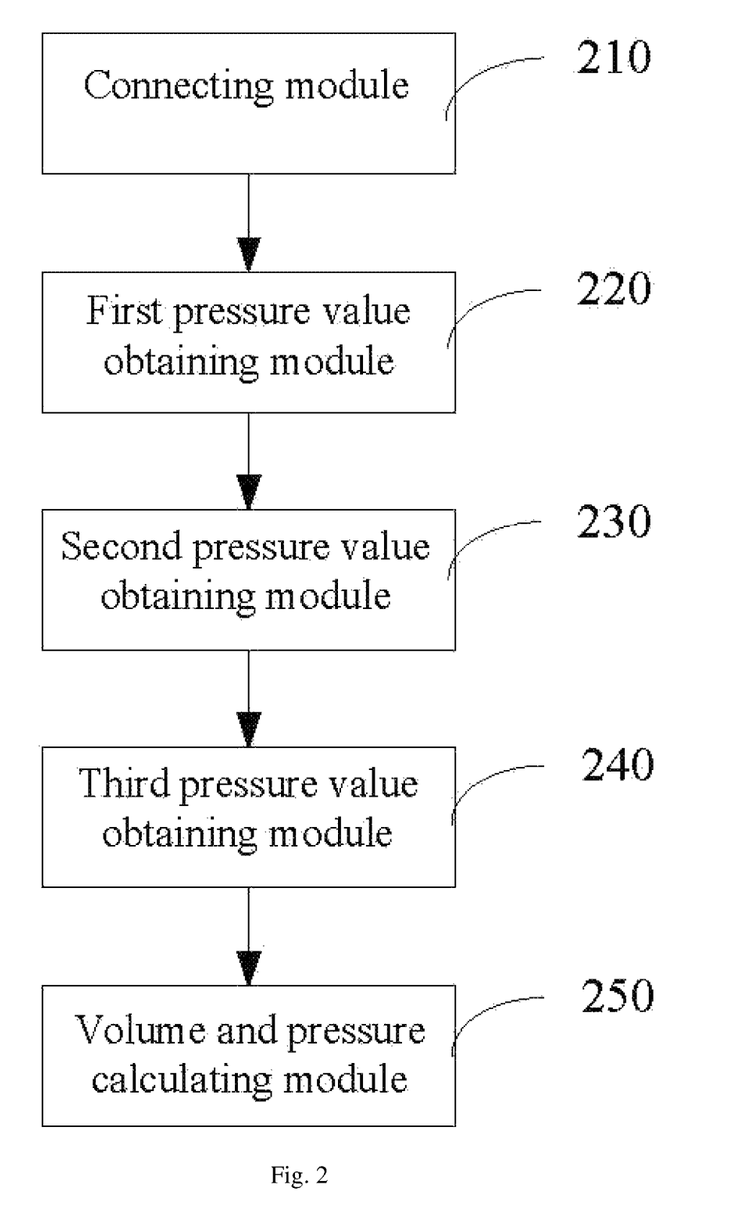
FIG. 2 is a block diagram showing a structure of an apparatus for calculating a volume of a compressed gas storage vessel, in one embodiment.

In one embodiment, as shown in FIG. 2, provided is an apparatus for calculating a volume of a compressed gas storage vessel, the apparatus including a connecting module 210, a first pressure value obtaining unit 220, a second pressure value obtaining unit 230, a third pressure value obtaining unit 240, and a volume and pressure calculating unit 250.

The connecting module 210 is configured to establish a connection between a compressed gas storage system and a gas dispenser. The gas dispenser includes a hose and at least three test vessels with known volume and initial pressure. The three test vessels are in communication with the compressed gas storage system via the hose. The three test vessels include a first vessel, a second vessel, and a third vessel. The first vessel is in communication with the hose via a first valve, the second vessel is in communication with the hose via a second valve, and the third vessel is in communication with the hose via a third valve. In an initial state, the first valve, the second valve, and the third valve are in a closed state.

The first pressure value obtaining module 220 is configured to open the first valve so that the first vessel is in communication with the compressed gas storage system, to detect a first pressure value of the first vessel, the hose and the compressed gas storage system when a pressure equilibrium state is reached between the first vessel, the hose, and the compressed gas storage system, and then to close the first valve.

The second pressure value obtaining module 230 is configured to open the second valve so that the second vessel is in communication with the compressed gas storage system, to detect a second pressure value of the second vessel, the hose and the compressed gas storage system when a pressure equilibrium state is reached between the second vessel, the hose, and the compressed gas storage system, and then to close the second valve.

The third pressure value obtaining module 240 is configured to open the third valve so that the third vessel is in communication with the compressed gas storage system, to detect a third pressure value of the third vessel, the hose and the compressed gas storage system when a pressure equilibrium state is reached between the third vessel, the hose and the compressed gas storage system, and then to close the third valve.

The volume and pressure calculating module 250 is configured to calculate the volume of the compressed gas storage system, the volume of the hose, and the pressure value of the compressed gas storage system in the initial state based on equations of relation between pressure and volume of gas and compressibility factor as well as the mass conservation principle and according to the volumes and initial pressures of the first, second and third vessels, the first pressure value, the second pressure value, and the third pressure value.

In one embodiment, the compressed gas includes one of gaseous hydrogen, vaporized liquid hydrogen, natural gas, vaporized liquefied natural gas, and gaseous propane.

In one embodiment, the gas dispenser further includes a nozzle and a control valve. The hose is in communication with the compressed gas storage system via the nozzle, and the control valve is provided on the hose.

In one embodiment, the initial pressure of the first vessel, the initial pressure of the second vessel, and the initial pressure of the third vessel are configured such that the initial pressure of the first vessel, the initial pressure of the second vessel, and the initial pressure of the third vessel are equal; alternatively, the initial pressure of the first vessel, the initial pressure of the second vessel, and the initial pressure of the third vessel are not equal.

In one embodiment, the volume of the first vessel, the volume of the second vessel, and the volume of the third vessel are configured such that the volume of the first vessel, the volume of the second vessel, and the volume of the third vessel are equal; alternatively, the volume of the first vessel, the volume of the second vessel, and the volume of the third vessel are not equal.

In one embodiment, a total mass of fuel that can be contained in the three test vessels is less than or equal to a mass of fuel specified by an industry standard.

In one embodiment, the initial pressure of the first vessel, the initial pressure of the second vessel, and the initial pressure of the third vessel are respectively 30% to 130% of a normal working pressure of the compressed gas storage system.

In one embodiment, the initial pressure of the first vessel, the initial pressure of the second vessel, and the initial pressure of the third vessel are respectively 80% to 125% of a normal working pressure of the compressed gas storage system.

For the specific limitation on the apparatus for calculating a volume of a compressed gas storage vessel, reference can be made to the above limitation on the method for calculating a volume of compressed gas storage vessel, and it will not be repeated here. Various modules in the apparatus for calculating a volume of a compressed gas storage vessel may be implemented in whole or in part by software, hardware, and a combination thereof. The above modules may be embedded in the form of hardware in or independent of a processor in a computer device, or may be stored in the form of software in a memory of the computer device, so that the processor can call and execute operations corresponding to the above modules.

In one embodiment, provided is a computer device, which is a device including an OMAP (Open Multimedia Application Platform) processor. A diagram of an internal structure of the computer device can be shown in FIG. 3. The computer device includes a processor, a memory, a network interface, a display screen, and an input apparatus which are connected by means of a system bus. The processor of the computer device is configured to provide calculation and control capabilities. The memory of the computer device includes a non-volatile storage medium and an internal memory. The non-volatile storage medium stores an operating system and a computer program. The internal memory provides an environment for the operation of the operating system and computer program in the non-volatile storage medium. The network interface of the computer device is configured to communicate with an upper computer via CAN connection. The computer program, when executed by the processor, realizes a method for calculating a volume of a compressed gas storage vessel. The display screen of the computer device can be a liquid crystal display screen or an electronic ink display screen. The input apparatus of the computer device may be a touch layer that covers the display screen, or may be a button, a trackball or a touchpad provided on the housing of the computer device, or may be an external keyboard, touchpad, or mouse.

Figure 3:
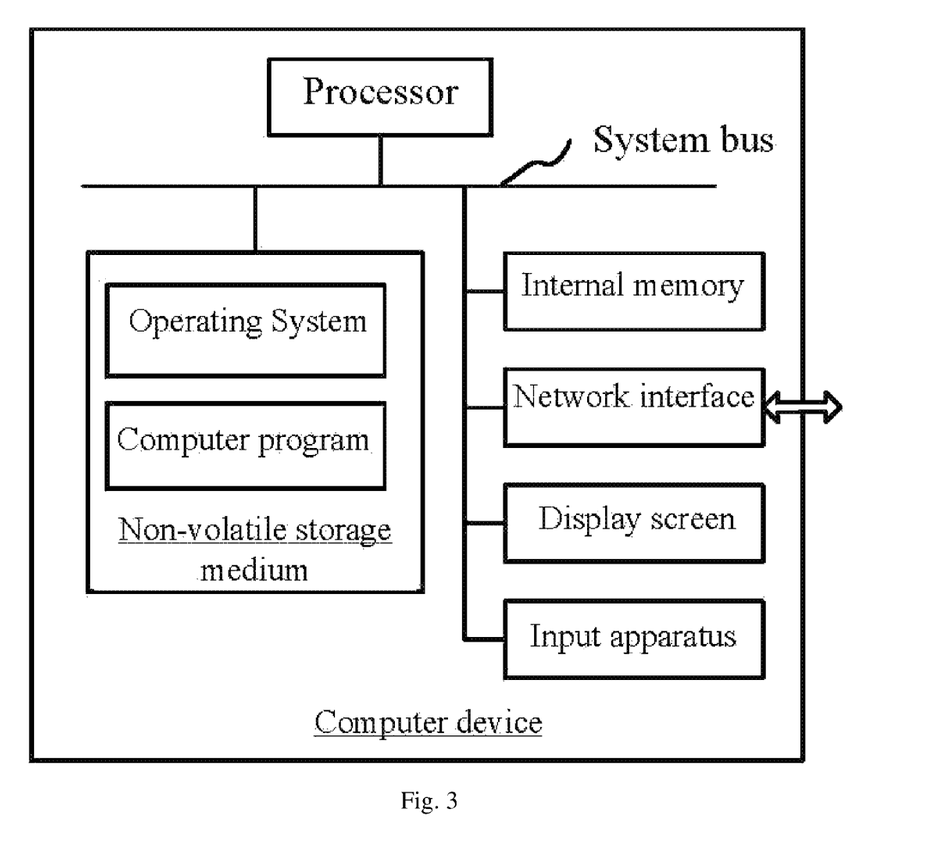
FIG. 3 is a diagram showing an internal structure of a computer device, in one embodiment.

Those skilled in the art can understand that the structure shown in FIG. 3 is only a block diagram of part of the structure related to the solution of the present application, and does not constitute a limitation on the computer device to which the solution of the present application is applied. The specific computer device may include more or less components than those shown in the figure, or may combine some components, or may have a different arrangement of the components.

In one embodiment, provided is a computer device including a memory and a processor, the memory storing therein a computer program. The processor implements the following steps when executing the computer program:

establishing a connection between the compressed gas storage system and a gas dispenser, the gas dispenser including a hose and at least three test vessels with known volume and initial pressure, the three test vessels being in communication with the compressed gas storage system via the hose, wherein the three test vessels include a first vessel, a second vessel, and a third vessel, wherein the first vessel is in communication with the hose via a first valve, the second vessel is in communication with the hose via a second valve, the third vessel is in communication with the hose via a third valve, and in an initial state, the first valve, the second valve, and the third valve are in a closed state;

opening the first valve so that the first vessel is in communication with the compressed gas storage system, detecting a first pressure value of the first vessel, the hose and the compressed gas storage system when a pressure equilibrium state is reached between the first vessel, the hose, and the compressed gas storage system, and then closing the first valve;

opening the second valve so that the second vessel is in communication with the compressed gas storage system, detecting a second pressure value of the second vessel, the hose and the compressed gas storage system when a pressure equilibrium state is reached between the second vessel, the hose, and the compressed gas storage system, and then closing the second valve;

opening the third valve so that the third vessel is in communication with the compressed gas storage system, and detecting a third pressure value of the third vessel, the hose and the compressed gas storage system when a pressure equilibrium state is reached between the third vessel, the hose, and the compressed gas storage system; and calculating the volume of the compressed gas storage system, a volume of the hose, and a pressure value of the compressed gas storage system in the initial state based on equations of relation between pressure and volume of gas and compressibility factor as well as the mass conservation principle and according to the volumes and initial pressures of the first, second and third vessels, the first pressure value, the second pressure value, and the third pressure value.

In one embodiment, provided is a computer-readable storage medium having stored thereon a computer program, which when executed by a processor, implements the following steps:

establishing a connection between the compressed gas storage system and a gas dispenser, the gas dispenser including a hose and at least three test vessels with known volume and initial pressure, the three test vessels being in communication with the compressed gas storage system via the hose, wherein the three test vessels include a first vessel, a second vessel, and a third vessel, wherein the first vessel is in communication with the hose via a first valve, the second vessel is in communication with the hose via a second valve, the third vessel is in communication with the hose via a third valve, and in an initial state, the first valve, the second valve, and the third valve are in a closed state;

opening the first valve so that the first vessel is in communication with the compressed gas storage system, detecting a first pressure value of the first vessel, the hose and the compressed gas storage system when a pressure equilibrium state is reached between the first vessel, the hose, and the compressed gas storage system, and then closing the first valve;

opening the second valve so that the second vessel is in communication with the compressed gas storage system, detecting a second pressure value of the second vessel, the hose and the compressed gas storage system when a pressure equilibrium state is reached between the second vessel, the hose, and the compressed gas storage system, and then closing the second valve;

opening the third valve so that the third vessel is in communication with the compressed gas storage system, and detecting a third pressure value of the third vessel, the hose and the compressed gas storage system when a pressure equilibrium state is reached between the third vessel, the hose, and the compressed gas storage system; and calculating the volume of the compressed gas storage system, a volume of the hose, and a pressure value of the compressed gas storage system in the initial state based on equations of relation between pressure and volume of gas and compressibility factor as well as the mass conservation principle and according to the volumes and initial pressures of the first, second and third vessels, the first pressure value, the second pressure value, and the third pressure value.

Those of ordinary skill in the art can understand that all or some of the processes in the method of the above embodiments can be implemented by a computer program instructing relevant hardware, wherein the computer program can be stored in a non-volatile computer-readable storage medium, and the computer program, when executed, may include processes in the above method embodiments. Any reference to memory, storage, database, or other media used in the embodiments provided in this application may include non-volatile and/or volatile memory. Non-volatile memory may include read-only memory (ROM), programmable ROM (PROM), electrically programmable ROM (EPROM), electrically erasable programmable ROM (EEPROM), or flash memory. Volatile memory may include random access memory (RAM) or external cache memory. By way of illustration and not limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

The technical features in the above embodiments can be combined arbitrarily. In order to make the description concise, all possible combinations of the technical features in the above embodiments are not described. However, as long as there is no contradiction in the combinations of these technical features, they should be considered within the scope of this description.

The above embodiments only describe several implementation manners of the present application, and the description of these embodiments is relatively specific and detailed, but it should not be understood as a limitation on the scope of the present disclosure. It should be noted that for those of ordinary skill in the art, several modifications and improvements can be made without departing from the concept of this application, and these modifications and improvements all fall within the scope of protection of this application. Therefore, the scope of protection of this application shall be subject to the appended claims.

The invention claimed is:

1. A method for calculating a volume of a compressed gas storage vessel, the method comprising:

establishing a connection between a compressed gas storage system and a gas dispenser, the gas dispenser comprising a hose and at least three test vessels with known volume and initial pressure, the three test vessels being in communication with the compressed gas storage system via the hose, wherein the three test vessels include a first vessel, a second vessel, and a third vessel, wherein the first vessel is in communication with the hose via a first valve, the second vessel is in communication with the hose via a second valve, the third vessel is in communication with the hose via a third valve, and in an initial state, the first valve, the second valve, and the third valve are in a closed state;

opening the first valve so that the first vessel is in communication with the compressed gas storage system, detecting a first pressure value when a pressure equilibrium state is reached between the first vessel, the hose, and the compressed gas storage system, and then closing the first valve;

opening the second valve so that the second vessel is in communication with the compressed gas storage system, detecting a second pressure value when a pressure equilibrium state is reached between the second vessel, the hose, and the compressed gas storage system, and then closing the second valve;

opening the third valve so that the third vessel is in communication with the compressed gas storage system, and detecting a third pressure value when a pressure equilibrium state is reached between the third vessel, the hose, and the compressed gas storage system; and calculating the volume of the compressed gas storage system, a volume of the hose, and a pressure value of the compressed gas storage system in the initial state according to the volumes and initial pressures of the first, second and third vessels, the first pressure value, the second pressure value, and the third pressure value, wherein a total mass of fuel contained in the three test vessels is less than or equal to a mass of fuel specified by an industry standard.

2. The method according to claim 1, wherein the compressed gas comprises one of gaseous hydrogen, vaporized liquid hydrogen, natural gas, vaporized liquefied natural gas, and gaseous propane.

3. The method according to claim 1, wherein the gas dispenser further comprises a control valve, wherein the hose is in communication with the compressed gas storage system, and the control valve is provided on the hose.

4. The method according to claim 1, wherein the initial pressure of the first vessel, the initial pressure of the second vessel, and the initial pressure of the third vessel are configured such that:

the initial pressure of the first vessel, the initial pressure of the second vessel, and the initial pressure of the third vessel are equal;

alternatively, the initial pressure of the first vessel, the initial pressure of the second vessel, and the initial pressure of the third vessel are not equal; and wherein the volume of the first vessel, the volume of the second vessel, and the volume of the third vessel are configured such that:

the volume of the first vessel, the volume of the second vessel, and the volume of the third vessel are equal;

alternatively, the volume of the first vessel, the volume of the second vessel, and the volume of the third vessel are not equal.

5. The method according to claim 1, wherein the initial pressure of the first vessel, the initial pressure of the second vessel, and the initial pressure of the third vessel are respectively 30% to 130% of a normal working pressure of the compressed gas storage system.

6. The method according to claim 5, wherein the initial pressure of the first vessel, the initial pressure of the second vessel, and the initial pressure of the third vessel are respectively 80% to 125% of a normal working pressure of the compressed gas storage system.

7. A non-transitory computer device comprising a memory and a processor, the memory having a computer program stored therein, wherein the computer program, when executed by the processor, implements steps of the method according to claim 1.

8. A non-transitory computer-readable storage medium having a computer program stored thereon, wherein the computer program, when executed by a processor, implements steps of the method according to claim 1.

9. An apparatus for calculating a volume of a compressed gas storage vessel, the apparatus comprising:
  a connecting module configured to establish a connection between a compressed gas storage system and a gas dispenser, the gas dispenser comprising a hose and at least three test vessels with known volume and initial pressure, the three test vessels being in communication with the compressed gas storage system via the hose, wherein the three test vessels include a first vessel, a second vessel, and a third vessel, wherein the first vessel is in communication with the hose via a first valve, the second vessel is in communication with the hose via a second valve, the third vessel is in communication with the hose via a third valve, and in an initial state, the first valve, the second valve, and the third valve are in a closed state;
  a first pressure value obtaining module configured to open the first valve so that the first vessel is in communication with the compressed gas storage system, to detect a first pressure value of the first vessel, the hose and the compressed gas storage system when a pressure equilibrium state is reached between the first vessel, the gas pipe, and the compressed gas storage system, and then to close the first valve;
  a second pressure value obtaining module configured to open the second valve so that the second vessel is in communication with the compressed gas storage system, to detect a second pressure value of the second vessel, the hose and the compressed gas storage system when a pressure equilibrium state is reached between the second vessel, the hose, and the compressed gas storage system, and then to close the second valve;
  a third pressure value obtaining module configured to open the third valve so that the third vessel is in communication with the compressed gas storage system, and to detect a third pressure value of the third vessel, the hose and the compressed gas storage system when a pressure equilibrium state is reached between the third vessel, the hose, and the compressed gas storage system; and
  a volume and pressure calculating module configured to calculate the volume of the compressed gas storage system, a volume of the hose, and a pressure value of the compressed gas storage system in the initial state according to the volumes and initial pressures of the first, second and third vessels, the first pressure value, the second pressure value, and the third pressure value.

* * * * *